United States Patent
Bhardwaj et al.

(10) Patent No.: US 8,775,855 B2
(45) Date of Patent: Jul. 8, 2014

(54) REDUCING MEMORY USED TO STORE TOTALS IN STATIC TIMING ANALYSIS

(75) Inventors: Sarvesh Bhardwaj, Fremont, CA (US); Khalid Rahmat, Fremont, CA (US); Kayhan Kucukcakar, Los Altos, CA (US); Rachid Helaihel, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 522 days.

(21) Appl. No.: 13/095,719

(22) Filed: Apr. 27, 2011

(65) Prior Publication Data

US 2012/0278647 A1      Nov. 1, 2012

(51) Int. Cl.
G06F 1/00      (2006.01)

(52) U.S. Cl.
USPC ........................... 713/500; 716/108

(58) Field of Classification Search
USPC ........................... 713/500; 716/108
See application file for complete search history.

(56) References Cited

U.S. PATENT DOCUMENTS

| | | | |
|---|---|---|---|
| 2005/0039094 A1* | 2/2005 | Yan | 714/726 |
| 2009/0150846 A1* | 6/2009 | Dirks et al. | 716/6 |
| 2012/0036171 A1* | 2/2012 | Rindner | 708/207 |
| 2012/0124534 A1* | 5/2012 | Kalafala et al. | 716/108 |

* cited by examiner

Primary Examiner — Chun Cao
(74) Attorney, Agent, or Firm — Fenwick & West LLP

(57) ABSTRACT

A system and a method are disclosed for reducing memory used in storing totals during static timing analysis. Totals are stored at various points along paths analyzed in static timing analysis. Some totals may not be merged for reasons including differing clock re-convergence pessimism removal (CRPR) dominators, exceptions, or clocks. Totals at a point may be stored in a super-tag mapping table and replaced at the point with a super-tag. The super-tag includes a super-tag ID referencing the totals stored in the super-tag mapping table. The super-tag also includes a time delay value. The time delay value allows the super-tag ID to be reused in other super-tags at other points while still storing total time delays at the other points. Therefore, the memory used to store totals is reduced in many situations.

20 Claims, 5 Drawing Sheets

REDUCING MEMORY USED TO STORE TOTALS IN STATIC TIMING ANALYSIS

BACKGROUND

1. Field of Art

The disclosure generally relates to the field of static timing analysis. More specifically, the disclosure relates to reducing memory used in static timing analysis through the use of super-tags.

2. Description of the Related Art

In static timing analysis (STA), total path time delays are calculated and propagated along various paths. These totals are stored as tagged totals at points along a path. The reason for storing different tags might include different clock reconvergence pessimism removal (CRPR) dominators, exceptions or clocks. The runtime and memory needed to store these tags has grown significantly as the complexity of designs has increased, particularly when CRPR is enabled or if there are a large number of exceptions in the design. Totals can be propagated forward to various endpoints which may cause the amount of memory used in storing totals to exceed the amount of available physical memory. This can cause disk-caching leading to significant bottlenecks in static timing analysis.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes reducing the amount of memory and computations used to store totals during STA through the use of super-tags. A super-tag references a set of total path delay values stored in a mapping table and indicates the delay of a timing path from the point that the super-tag was generated. This delay is applied to the referenced set of totals stored in the mapping table. This reduces memory used in storage of totals at points along the path and reduces the computations that are needed for propagation.

Electronic Design Automation Process Overview

Figure 1:
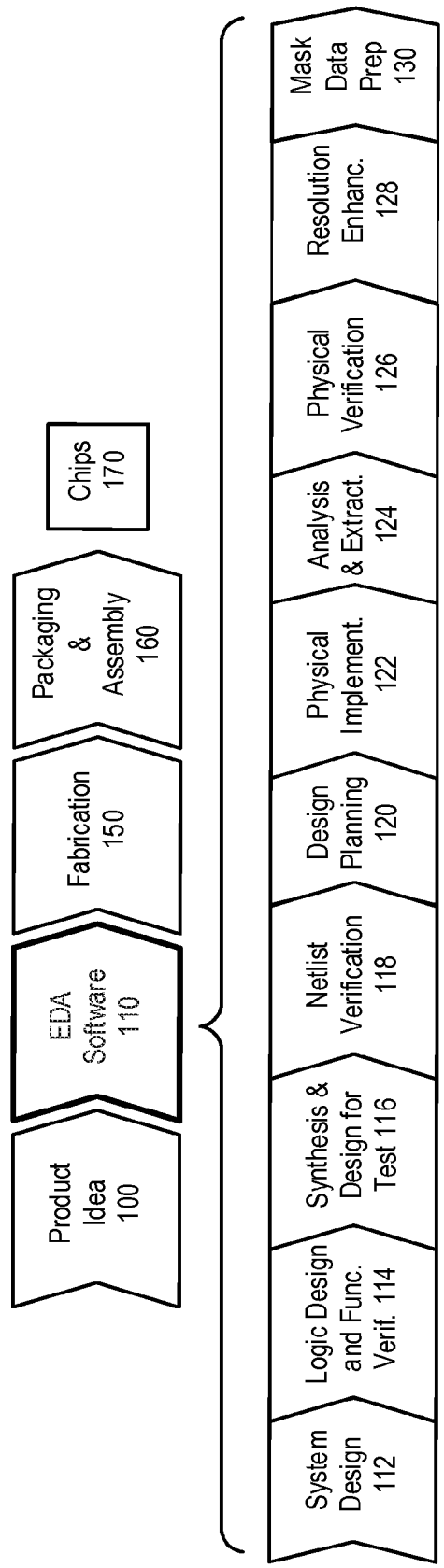
FIG. 1 illustrates one embodiment of components of an example machine able to read instructions from a machine-readable medium and execute them in a processor (or controller).

FIG. 1 illustrates various steps in the design and fabrication of an integrated circuit. The process typically starts with a product idea 100, which is realized using Electronic Design Automation (EDA) software 110. Chips 170 can then be produced from the finalized design by performing fabrication 150 and packaging and assembly 160.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a Hardware Description Language (HDL) design can be created and checked for functional accuracy.

In the synthesis and design step 116, the HDL code can be translated to a netlist, which can be optimized for the target technology. Further, tests can be designed and implemented to check the finished chips. In the netlist verification step 118, the netlist can be checked for compliance with timing constraints and for correspondence with the HDL code.

In the design planning step 120, an overall floor plan for the chip can be constructed and analyzed for timing and top-level routing. Next, placement and routing can be performed in the physical implementation step 122.

In the analysis and extraction step 124, the circuit functionality can be verified at a transistor level. In the physical verification step 126, the design can be checked to correct any functional, manufacturing, electrical, or lithographic issues.

In the resolution enhancement step 128, geometric manipulations can be performed on the layout to improve manufacturability of the design. Finally, in the mask data preparation step 130, the design can be taped-out for production of masks to produce finished chips.

Embodiments disclosed herein can be used during one or more of the above-described stages. Specifically, in some embodiments the disclosed configurations can be used during logic design and functional verification step 114.

Computing Machine Architecture

Figure 2:
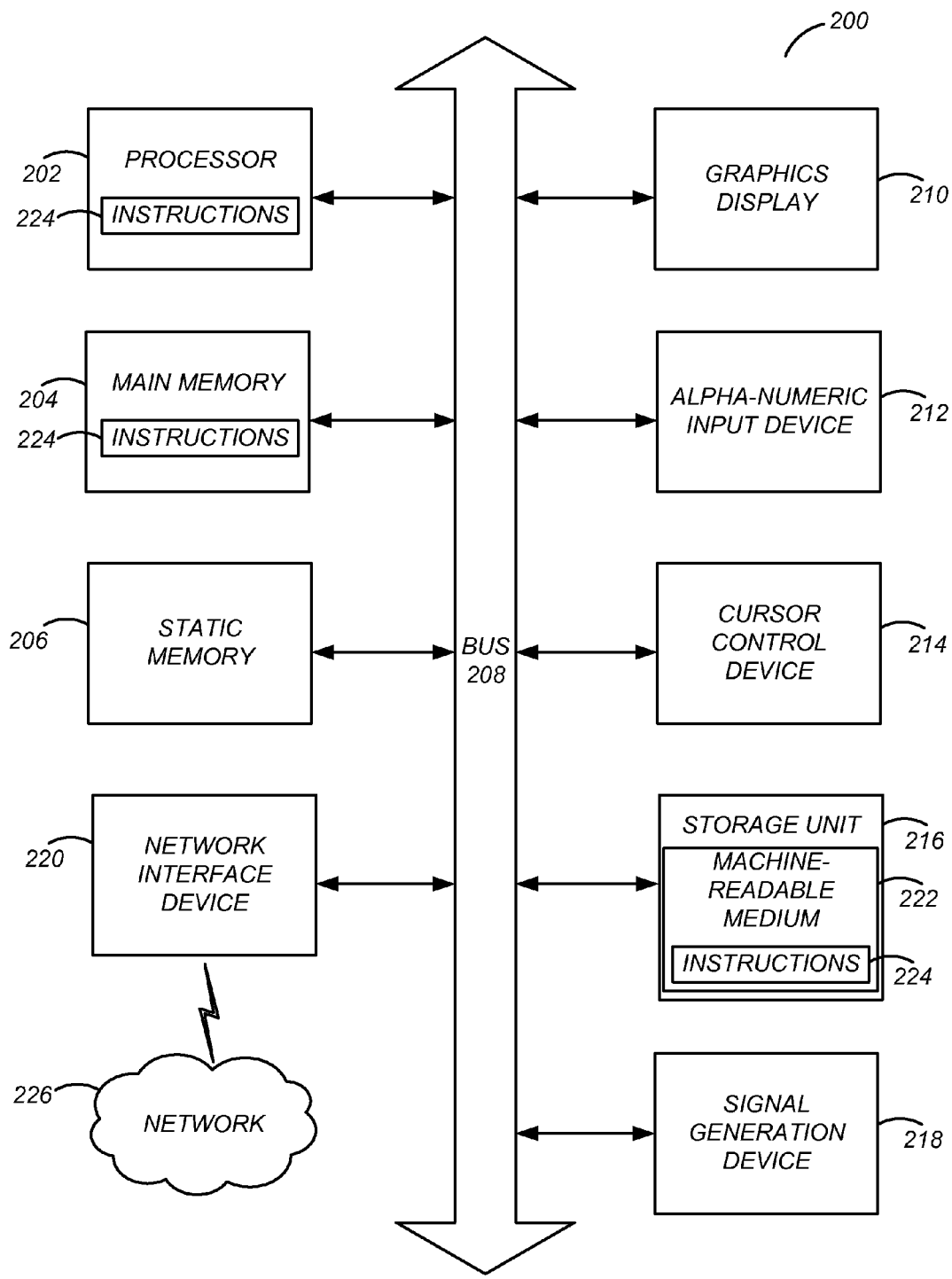
FIG. 2 illustrates one embodiment of components of an example machine able to read instructions from a machine-readable medium and execute them in a processor (or controller).

The disclosed configurations may be structured as instructions executable by a machine in one embodiment. FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a touch sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 through the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Example Configurations

Figure 3:
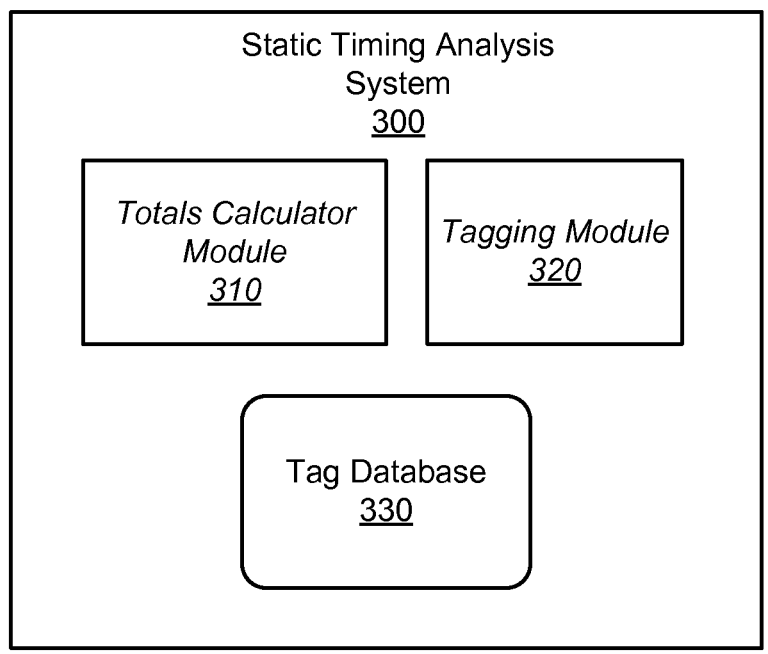
FIG. 3 illustrates one embodiment of a high level block diagram of an example system for generating super-tags.

Turning now to FIG. 3, it illustrates one embodiment of a high level block diagram of a static timing analysis system 300 which generates super-tags. The system 300 includes a totals calculator module 310, a tagging module 320 and a tag database 330. The totals calculator module 310 calculates the total time delay along paths from one point to another. In one embodiment a path begins from a starting point and includes every node from that starting point. Time delays from multiple points can be stored in a path.

The tagging module 320 generates tags that store calculated totals and associates them with a node or component. The tagging module 320 also creates super-tags when the number of totals at a node reaches or exceeds a super-tag threshold. A super-tag makes reference to a set of totals that is stored in a memory and contains an additional delay that is applied to the referenced total. Tagged totals and totals references by a super-tag are both stored in a tag database 330. The tag database 330 may be configured to store the data in a table type format, e.g., within a storage unit 216. Storage in the database 330 allows totals to be retrieved for any node or point in a network.

Figure 4:
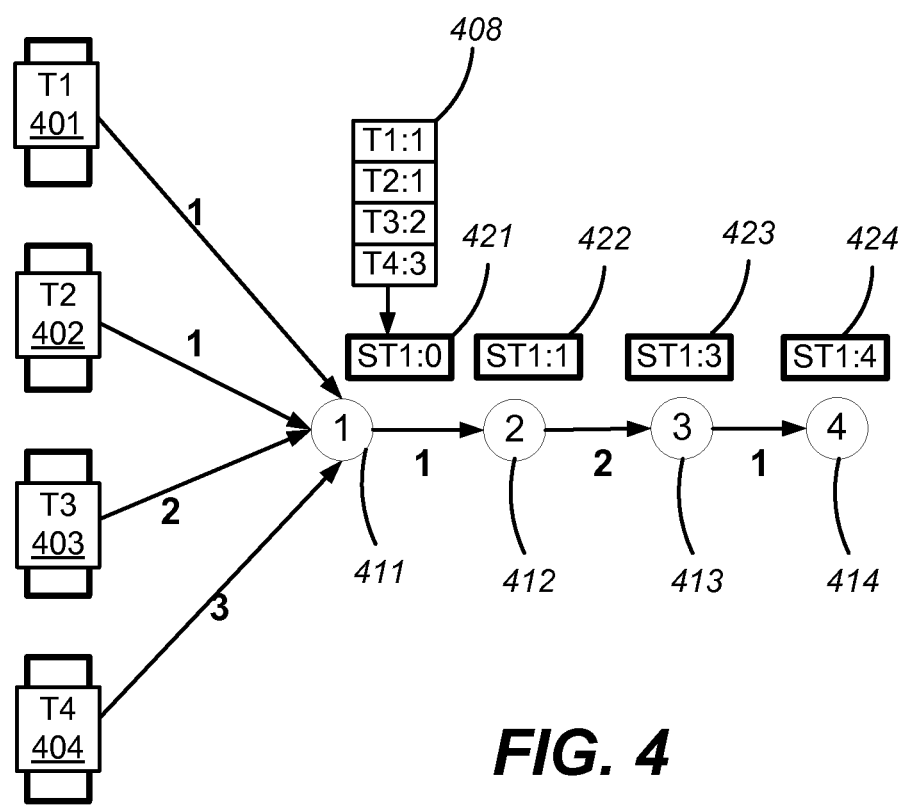
FIG. 4 illustrates an example of super-tags used in a path according to one embodiment.

Referring next to FIG. 4, it illustrates an example of super-tags used in a path according to one embodiment. FIG. 4 includes starting points T1 401, T2 402, T3 403 and T4 404. Each of these starting points is coupled to node 1 411, with each starting point being associated with a delay. The delay is calculated and stored as a tagged total 408 by the tagging module 320. This tagged total 408 stores a delay value corresponding to each of the starting points determined by the totals calculator module 310. When the number of tagged totals at a location reaches a predefined number, e.g., 3, a super-tag is generated. It is noted that the predefined number corresponds to a threshold, and in this example the threshold of 3 is merely an example. The super-tag threshold does not need to be set at the predetermined threshold at beginning of operations; rather it can be determined and set at run time based on current conditions within the network, e.g., delay time; path length, or other network condition.

As four values are stored in tagged total 408, a super-tag ST1 421 is created at node 1 411. Super-tag ST1 421 includes both a super-tag ID and a super-tag delay value. The super-tag ID references a set of totals stored in a super-tag map table and the super-tag delay value indicates a modifier that should be applied to the set of totals identified by a super-tag ID. In this case, the super-tag delay of ST1 421 is 0 because it is the location at which the super-tag was created.

Additional super-tags ST1 422, 423 and 424 are located at node 2 412, node 3 413 and node 4 414 respectively. All of these super-tags ST1 422, 423 and 424 refer to the same tagged totals 408 stored in the super-tag mapping table as part of the tag database 330. However, each of the super-tags ST1 422, 423 and 424 contain different delay values. Super-tag ST1 422 contains a delay value of 1 since there is a delay of 1 unit between node 1 411, where the super-tag was generated by tagging module 320, and node 2 412, where ST1 422 is located. Super-tag ST1 423 at node 3 contains a delay value of 3, which is the cumulative delay from node at which the super-tag was generated, i.e., the delay from node 1 411 to node 2 412 is 1 and the delay from node 2 412 to node 3 413 is 2. Similarly, super-tag ST1 424 at node 4 414 contains a delay value of 4. This accounts for the additional delay of 1 between node 3 413 and node 4 414.

Therefore, rather than storing an instance of tagged totals 408 at each node, only a single instance is stored in memory. Super-tags refer to this once instance with a delay modifier that is applied to determine accurate timing information at any location associated with a super-tag.

Figure 5:
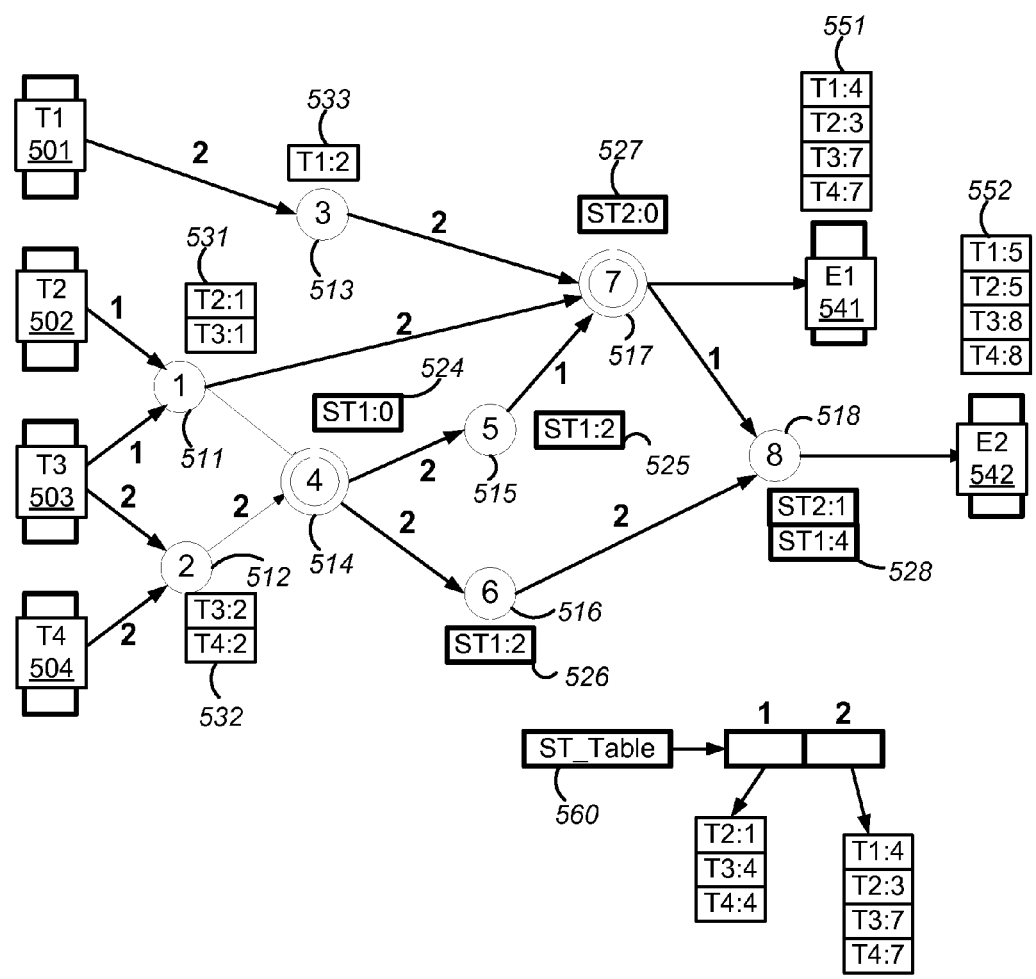
FIG. 5 illustrates an example of super-tags used along multiple paths according to one embodiment.

FIG. 5 illustrates an example of super-tags used along multiple paths according to one embodiment of a system similar to the static timing analysis system 300 described in FIG. 3. FIG. 5 includes starting points T1 501, T2 502, T3 503 and T4 504. Node 1 511 is coupled to receive input from T2 502 and T3 503. Each of the paths to node 1 511 has a delay of 1. Therefore, a delay of 1 is stored for T2 502 and T3 503 at the node 1 tagged total 531. Similarly, node 2 512 is coupled to T3 503 and T4 504. Each of the paths to node 2 512 has a delay of 2. Therefore, a delay of 2 is stored for T3 503 and T4 504 at the node 2 tagged total 532. Node 3 is coupled to T1 501 with a delay of 3. This delay is stored in the node 3 tagged total 533 in the tag database 330.

Node 4 is coupled to receive a signal from node 1 511 and node 2 512. This means that the node 1 tagged total 531 and the node 2 tagged total 532 must be combined and account for the additional delay associated with node 4 514. There is no delay indicated between node 1 511 and node 4 514. Therefore, node the value associated with T2 502 remains at 1. Both the node 1 tagged total 531 and the node 2 tagged total 532 contain a value associated with T3 503. The value from node 1 511 remains at 1, while the value from node 2 512 is determined to be 4 by the tagging module 320. The higher value of 4 is stored at node 4 and associated with T3 503. A value of 2 associated with T4 504 at node 2 512 is increased to 4 at node 4 514. Since, three delay values need to be stored at node 4 514, a super-tag ST1 is generated. Super-tag ST1 524 at node 4 contains a super-tag ID of ST1. Due to being the super-tag ST1 origination point, super-tag 524 contains an additional delay of 0. The super-tag ID ST1 references the first entry in the super-tag mapping table 560 located in the tag database 330. This allows additional super-tags to reference the same entry without storing redundant data.

Node 5 515 receives a signal from only node 4 514 with an additional delay of 2. This means that the same super-tag ID ST1 can be used at node 5 515. Super-tag 525 contains super-tag ID ST1 with a delay value of 2. This allows the proper values for node 5 515 to be generated by referencing the first entry of the super-tag mapping table 560. In this case, applying super-tag 525 would produce values of T2:3, T3:6 and T4:6.

Similarly, node 6 516 receives a signal from only node 4 514 with an additional delay of 2. Super-tag 526 at node 6 516 contains super-tag ID ST1 with a delay value of 2. This corresponds to values of T2:3, T3:6 and T4:6.

An additional super-tag ID ST2 is generated at node 7 517 by the tagging module 320. Node 7 517 receives signals from node 3 513, node 1 511 and node 5 515. The value of T1:2 533 stored at node 3 513 is increased by 2 due to the additional delay to node 7 517. The delay values T2:1 and T3:1 at node 1 511 are also increased by 2. Super-tag 525 is associated with node 5 515 and the delay from node 5 515 is 1. This results in corresponding delays at node 7 517 of T2:4, T3:7 and T4:7. Since multiple entries for starting points T2 502 and T3 503 arrive at node 7 517, the higher of the associated delay values are chosen. This results in values of T1:4, T2:3, T3:7 and T4:7 at node 7 517. As the number of totals exceeds the super-tag threshold, a new super-tag ID ST2 is generated by the tagging module 320. Accordingly, the totals associated with node 7 517 are stored as a second entry in the super-tag mapping table 560. Super-tag 527 contains super-tag ID ST2 and an additional delay of 0.

Finally, node 8 518 receives signals from node 6 516 and node 7 517. The input includes super-tag IDs ST1 from node 6 516 and ST2 from node 7 517. The delay associated with ST1 is increased from 2 to 4 due to the additional delay between node 6 516 and node 8 518. Similarly, the delay associated with ST2 is increased from 0 to 1 due to the additional delay introduced between node 7 517 and node 8 518. These updated super-tags are stored as super-tag totals 528 at node 8 518 in the tag database 330. It should be noted that multiple super-tags can be stored at a location when the number of super-tags does not meet the designated super-tag threshold. In one embodiment, different thresholds are used in generating super-tags from normal tags and super-tags.

Endpoint 1 541 is tied to node 7 517. The Endpoint 1 totals 551 can be determined from the node 7 super-tag 527. Similarly, Endpoint 2 542 is tied to node 8 518. The Endpoint 2 totals 552 can be determined from the node 8 super-tags 528. Since both ST1 and ST2 contain values associated with starting points T2, T3 and T4, the greater values are chosen at Endpoint 2 542.

Therefore, the disclosed process reduces the memory used in storing totals at various nodes in FIG. 5. For example, rather than storing separate instances of totals at nodes 4, 5, 6, 7 and 8, reference is made to two super-tag totals stored in the super-tag mapping table 560.

Additional Configuration Considerations

Throughout this specification, plural instances may implement components, operations, or structures described as a single instance. Although individual operations of one or more methods are illustrated and described as separate operations, one or more of the individual operations may be performed concurrently, and may not be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as illustrated and described in FIG. 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein, e.g., in FIGS. 3 through 5, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., computer memory 204). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for using super-tags to reduce the memory used in static timing analysis through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for performing static timing analysis, the method comprising:
   determining a plurality of path delays, the plurality of path delays associated with a current node between a start node and an end node, and each of the plurality of path delays associated with a path between a start node and the current node in a circuit;
   storing the plurality of path delays;
   grouping the plurality of path delays associated with the current node responsive to a number of path delays associated with the current node being greater than a threshold number; and
   associating, by a computer, a single delay value to the grouped plurality of path delays and the current node, the single delay value representing an accumulated static timing delay between the current node and at least one previous node associated with grouped path delays.

2. The method of claim 1, wherein the threshold is 3.

3. The method of claim 1, further comprising:
   storing a value representing a start node of a path; and
   associating the stored value representing the start node of the path to a corresponding path delay from the plurality of path delays, the corresponding path delay associated with the start node.

4. The method of claim 1, wherein determining the plurality of path delays comprises:
   determining a previous node path delay, the previous node path delay associated with a previous node located in the path and placed before the current node;
   determining a delay between the previous node and the current node; and
   determining a path delay from the plurality of path delays based on the previous node path delay and the determined delay between the previous node and the current node.

5. The method of claim 1, further comprising:
   determining a delay between the current node and a next node placed after the current node in the path;
   determining another single delay value based on the determined delay between the current node and the next node, and the single delay value associated with the grouped plurality of path delays; and
   associating the determined other single delay value to the grouped plurality of path delays and the next node.

6. The method of claim 1, wherein determining the plurality of path delays comprises:
   identifying another grouped plurality of path delays, the other grouped plurality of path delays associated with a first previous node located in a first path from the paths associated with each of the plurality of path delays, and placed before the current node, the other grouped plurality of path delays having associated a single delay value;
   determining a delay between the first previous node and the current node;
   identifying a first path delay from the other grouped plurality of path delays associated with the first previous node, the identified first path delay associated with a first start node; and
   determining a first new path delay associated with the first start node based on the first path delay, the single delay value associated with the other grouped plurality of path delays, and the determined delay between the first previous node and the current node.

7. The method of claim 6, wherein determining the plurality of path delays further comprises:
   identifying a second path delay associated with a second previous node, the second previous node located in a second path from the plurality of paths, and placed before the first node, the second previous node different from the first previous node, the second path delay associated with the first start node;
   determining a delay between the second previous node and the current node;
   determining a second new path delay associated with the first start node based on the second path delay and the determined delay between the second previous node and the current node;
   responsive to the second new path delay being smaller than the first new path delay, determining a path delay associated with the first start node, from the plurality of path delays based on the determined second new path delay.

8. A non-transitory computer-readable storage medium storing executable instructions for performing static timing analysis, the instructions when executed by a processor cause the processor to:
   determine a plurality of path delays, the plurality of path delays associated with a current node between a start node and an end node, and each of the plurality of path delays associated with a path between a start node and the first node in a circuit;
   store the plurality of path delays;
   group the plurality of path delays associated with the current node responsive to a number of path delays associated with the current node being greater than a threshold number; and
   associate a single delay value to the grouped plurality of path delays and the current node, the single delay value representing an accumulated static timing delay between the current node and at least one previous node associated with grouped path delays.

9. The non-transitory computer-readable storage medium of claim 8 wherein the threshold is 3.

10. The non-transitory computer-readable storage medium of claim 8, wherein the instructions when executed by the processor further cause the processor to:
    store a value associated with a start node of a path; and
    associate the stored value associated with the start node of the path to a corresponding path delay from the plurality of path delays.

11. The non-transitory computer-readable storage medium of claim 8, wherein the instructions for determining the plurality of path delays cause the processor to:
    determine a previous node path delay, the previous node path delay associated with a previous node located in the path, prior to the current node;
    determine a delay between the previous node and the current node; and
    determine a path delay from the plurality of path delays based on the previous node path delay and the determined delay between the previous node and the current node.

12. The non-transitory computer-readable storage medium of claim 8, wherein the instructions when executed by the processor further cause the processor to:
    determine a delay between the current node and a next node, the next node coupled to the current node and located after the current node;
    determine another single delay value based on the determined delay between the current node and the next node, and the single delay value associated with the grouped plurality of path delays; and
    associate the determined other single delay value to the grouped plurality of path delays and the next node.

13. The non-transitory computer-readable storage medium of claim 8, wherein the instructions for determining the plurality of path delays cause the processor to:
    identify another grouped plurality of path delays, the other grouped plurality of path delays associated with a first previous node located in a first path from the plurality of paths, and prior to the current node, the other grouped plurality of path delays having associated a single delay value;
    determine a delay between the first previous node and the current node;
    identify a first path delay from the other grouped plurality of path delays associated with the first previous node, the identified first path delay associated with a first start node; and
    determine a first new path delay associated with the first start node based on the first path delay, the single delay value associated with the other grouped plurality of path delays, and the determined delay between the first previous node and the current node.

14. The non-transitory computer-readable storage medium of claim 13, wherein the instructions for determining the plurality of path delays further cause the processor to:
    identify a second path delay associated with a second previous node, the second previous node located in a second path from the plurality of paths, and prior to the first node, the second previous node different from the first previous node, the second path delay associated with the first start node;
    determine a delay between the second previous node and the current node;

determine a second new path delay associated with the first start node based on the second path delay and the determined delay between the second previous node and the current node;

responsive to the second new path delay being smaller than the first new path delay, determine a path delay, associated with the first start node, from the plurality of path delays based on the determined second new path delay.

15. A system comprising:
a processor; and
a non-transitory computer-readable storage medium storing executable instructions for performing static timing analysis, the instructions when executed by the processor cause the processor to:
determine a plurality of path delays, the plurality of path delays associated with a current node between a start node and an end node, and each of the plurality of path delays associated with a path between a start node and the first node in a circuit;
store the plurality of path delays;
group the plurality of path delays associated with the current node responsive to a number of path delays associated with the current node being greater than a threshold number; and
associate a single delay value to the grouped plurality of path delays and the current node, the single delay value representing an accumulated static timing delay between the current node and at least one previous node associated with grouped path delays.

16. The system of claim 15, wherein the instructions when executed by the processor further cause the processor to:
store a value associated with a start node of a path; and
associate the stored value associated with the start node of the path to a corresponding path delay from the plurality of path delays.

17. The system of claim 15, wherein the instructions for determining the plurality of path delays cause the processor to:
determine a previous node path delay, the previous node path delay associated with a previous node located in the path, prior to the current node;
determine a delay between the previous node and the current node; and
determine a path delay from the plurality of path delays based on the previous node path delay and the determined delay between the previous node and the current node.

18. The system of claim 15, wherein the instructions when executed by the processor further cause the processor to:
determine a delay between the current node and a next node, the next node coupled to the current node and located after the current node;
determine another single delay value based on the determined delay between the current node and the next node, and the single delay value associated with the grouped plurality of path delays; and
associate the determined other single delay value to the grouped plurality of path delays and the next node.

19. The system of claim 15, wherein the instructions for determining the plurality of path delays cause the processor to:
identify another grouped plurality of path delays, the other grouped plurality of path delays associated with a first previous node located in a first path from the plurality of paths, and prior to the current node, the other grouped plurality of path delays having associated a single delay value;
determine a delay between the first previous node and the current node;
identify a first path delay from the other grouped plurality of path delays associated with the first previous node, the identified first path delay associated with a first start node; and
determine a first new path delay associated with the first start node based on the first path delay, the single delay value associated with the other grouped plurality of path delays, and the determined delay between the first previous node and the current node.

20. The system of claim 19, wherein the instructions for determining the plurality of path delays further cause the processor to:
identify a second path delay associated with a second previous node, the second previous node located in a second path from the plurality of paths, and prior to the first node, the second previous node different from the first previous node, the second path delay associated with the first start node;
determine a delay between the second previous node and the current node;
determine a second new path delay associated with the first start node based on the second path delay and the determined delay between the second previous node and the current node;
responsive to the second new path delay being smaller than the first new path delay, determine a path delay, associated with the first start node, from the plurality of path delays based on the determined second new path delay.

* * * * *